(12) United States Patent
Ishii et al.

(10) Patent No.: US 9,487,655 B2
(45) Date of Patent: Nov. 8, 2016

(54) POLYAMIDE RESIN COMPOSITION FOR INNER LAYER OF DELAMINATION CONTAINER, AND DELAMINATION CONTAINER OBTAINED USING SAME

(71) Applicant: Mitsubishi Gas Chemical Company, Inc., Tokyo (JP)

(72) Inventors: Kentaro Ishii, Kanagawa (JP); Tomonori Kato, Kanagawa (JP); Takafumi Oda, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/772,062

(22) PCT Filed: Mar. 13, 2014

(86) PCT No.: PCT/JP2014/056774
§ 371 (c)(1),
(2) Date: Sep. 1, 2015

(87) PCT Pub. No.: WO2014/156701
PCT Pub. Date: Oct. 2, 2014

(65) Prior Publication Data
US 2016/0083581 A1 Mar. 24, 2016

(30) Foreign Application Priority Data

Mar. 28, 2013 (JP) .................. 2013-069040

(51) Int. Cl.
*B29C 49/00* (2006.01)
*B65D 1/02* (2006.01)
*C08L 77/02* (2006.01)
*C08L 77/06* (2006.01)
*B65D 65/40* (2006.01)
*B32B 27/34* (2006.01)
*B32B 27/08* (2006.01)
*B32B 27/30* (2006.01)
*B32B 27/32* (2006.01)
*B32B 27/36* (2006.01)
*B65D 83/00* (2006.01)
*B29K 77/00* (2006.01)
*B29K 101/12* (2006.01)
*B29L 31/00* (2006.01)

(52) U.S. Cl.
CPC ............ *C08L 77/06* (2013.01); *B29C 49/0005* (2013.01); *B29C 49/0031* (2013.01); *B32B 27/08* (2013.01); *B32B 27/304* (2013.01); *B32B 27/32* (2013.01); *B32B 27/34* (2013.01); *B32B 27/36* (2013.01); *B65D 1/0215* (2013.01); *B65D 65/40* (2013.01); *C08L 77/02* (2013.01); *B29K 2077/00* (2013.01); *B29K 2101/12* (2013.01); *B29K 2995/0046* (2013.01); *B29K 2995/0098* (2013.01); *B29L 2031/712* (2013.01); *B32B 2250/24* (2013.01); *B32B 2307/54* (2013.01); *B32B 2307/7244* (2013.01); *B32B 2439/00* (2013.01); *B32B 2439/70* (2013.01); *B65D 83/0055* (2013.01); *C08L 2203/10* (2013.01); *C08L 2205/025* (2013.01)

(58) Field of Classification Search
CPC .... C08L 77/02; C08L 77/06; C08L 2203/10; C08L 2205/025; B29C 49/0005; B29C 49/0031; B29K 2077/00; B29K 2101/12; B29K 2995/0046; B29K 2995/0098; B29L 2031/712; B32B 27/08; B32B 27/304; B32B 27/32; B32B 27/34; B32B 27/36; B32B 2250/24; B32B 2307/54; B32B 2307/7244; B32B 2439/00; B32B 2439/70; B65D 1/0215; B65D 65/40; B65D 83/0055
See application file for complete search history.

(56) References Cited

U.S. PATENT DOCUMENTS

| | | | | |
|---|---|---|---|---|
| 5,435,452 A | * | 7/1995 | Nishigami | .......... B05B 11/0043 215/12.1 |
| 6,221,502 B1 | * | 4/2001 | Takashige | ............... B29C 55/12 428/34.3 |
| 6,266,943 B1 | | 7/2001 | Nomoto et al. | |

(Continued)

FOREIGN PATENT DOCUMENTS

| | | |
|---|---|---|
| JP | 8-156973 | 6/1996 |
| JP | 8-310534 | 11/1996 |

(Continued)

OTHER PUBLICATIONS

International Search Report date of mailing Apr. 28, 2014 for PCT/JP2014/056774 and English translation of the same (4 pages).

*Primary Examiner* — Callie Shosho
*Assistant Examiner* — John Freeman
(74) *Attorney, Agent, or Firm* — Fitch, Even, Tabin & Flannery LLP

(57) ABSTRACT

Provided are a polyamide resin composition for inner layer of a delamination container which includes a laminate of at least two layers including an outer layer (1) composed of a thermoplastic resin (A) and an inner layer (2) composed of a polyamide resin composition and capable of being delaminated from the outer layer (1) to perform volume reduction deformation and in which an outside air introduction hole for introducing the outside air into between the outer layer (1) and the inner layer (2) is formed in the outer layer (1), the polyamide resin composition containing specified polyamide resin (a) and polyamide resin (b), having a tensile modulus of elasticity of 2,000 MPa or less at a temperature of 23°C. and a humidity of 50% RH, and having a content of the polyamide resin (a) in the polyamide resin composition of 20 to 75% by mass; and a delamination container using the same as an inner layer.

6 Claims, No Drawings

(56) References Cited

U.S. PATENT DOCUMENTS

| | | |
|---|---|---|
| 6,670,007 B1 | 12/2003 | Safian et al. |
| 2005/0143519 A1* | 6/2005 | Maruo .................. B32B 27/08 525/92 B |
| 2007/0104971 A1* | 5/2007 | Wursche ................ B32B 27/34 428/474.4 |
| 2009/0239013 A1 | 9/2009 | Otaki et al. |

FOREIGN PATENT DOCUMENTS

| | | |
|---|---|---|
| JP | 2000-335635 | 12/2000 |
| JP | 2004-231280 | 8/2004 |
| JP | 2007-223099 | 9/2007 |
| KR | 10-2009-0013202 A | 2/2009 |

* cited by examiner

POLYAMIDE RESIN COMPOSITION FOR INNER LAYER OF DELAMINATION CONTAINER, AND DELAMINATION CONTAINER OBTAINED USING SAME

CROSS-REFERENCE TO RELATED APPLICATIONS

This application is a U.S. national phase application filed under 35 U.S.C. §371 of International Application PCT/JP2014/056774, filed on Mar. 13, 2014, designating the United States, which claims priority from Japanese Application No. 2013-069040, filed Mar. 28, 2013, which are hereby incorporated herein by reference in their entirety.

TECHNICAL FIELD

The present invention relates to a polyamide resin composition for inner layer of a delamination container and a delamination container using the same.

BACKGROUND ART

There is known a delamination container which is composed of a laminate of at least two layers including an outer layer and an inner layer capable of being delaminated from the outer layer to perform volume reduction deformation and in which an outside air introduction hole for introducing the outside air into between the outer layer and the inner layer is formed in the outer layer (see, for example, PTL 1). According to this container, when the outside air is introduced into between the outer layer and the inner layer from the outside air introduction hole with a decrease in the contents preserved within the inner layer, the inner layer is delaminated from the outer layer, whereby only the inner layer is subjected to volume reduction deformation without causing deformation of the outer layer. As a result, it is possible to prevent the contents from oxidation without causing direct contact of the contents with the air until the contents are emptied completely.

In such a delamination container, a polyolefin, such as polyethylene and polypropylene, is used as a resin for outer layer, and nylon, an ethylene-vinyl alcohol copolymer, or the like is used as a resin for inner layer. In PTL 1, a nylon-made resin which does not substantially have compatibility with a low-density polyethylene-made resin is described as the resin for inner layer.

As for the delamination container, improvements are being advanced every year. For that reason, though further investigations are also demanded with respect to the resin for inner layer to be used therefor, those are not sufficient.

For example, in PTL 2, flexible synthetic resins having a flexural modulus of elasticity of 10,000 kg/cm² or less are described, and specifically, a nylon 6 copolymer having a flexural modulus of elasticity of 650 kg/cm² is described. In the delamination container described in PTL 2, from the viewpoint of preventing interlaminar delamination of the seal part formed in the container bottom from occurring, a nerve resin material having a flexural modulus of elasticity of more than 10,000 kg/cm² could not be used.

On the other hand, in the delamination container described in PTL 1, the interlaminar delamination of the seal part formed in the container bottom is positively utilized as the outside air introduction hole for introducing the outside air into between the outer layer and the inner layer. For that reason, even among materials which could not be used as the resin for inner layer at that time when PTL 2 was described, some of them have become usable as a result of a structural improvement of the container. Meanwhile, in PTL 1, the nylon-made resin is merely generally described as a suitable material, and it is not specifically disclosed on what kind of nylon-made resin is suitable.

CITATION LIST

Patent Literature

[PTL 1] JP-A-2004-231280
[PTL 2] JP-A-8-310534

SUMMARY OF INVENTION

A technical problem of the present invention is to provide a polyamide resin composition suitable as a material for inner layer of a delamination container which is excellent in delamination properties between an outer layer and an inner layer, performs volume reduction deformation of only the inner layer with a decrease in the contents preserved within the inner layer without causing deformation of the outer layer, has a low oxygen transmission coefficient, and is excellent in oxygen barrier properties, and a delamination container using the same.

The present invention provides a polyamide resin composition, a delamination container, and a method for producing a delamination container as described below.

1, A polyamide resin composition for inner layer of a delamination container which comprises a laminate of at least two layers including an outer layer (1) composed of a thermoplastic resin (A) and an inner layer (2) composed of a polyamide resin composition and capable of being delaminated from the outer layer (1) to perform volume reduction deformation and in which an outside air introduction hole for introducing the outside air into between the outer layer (1) and the inner layer (2) is formed in the outer layer (1),
wherein the polyamide resin composition for inner layer comprises:
a polyamide resin (a) constituted of a diamine component including 70 mol % or more of m-xylylenediamine and a dicarboxylic acid component including 70 mol % or more of a linear aliphatic dicarboxylic acid having 6 to 18 carbon atoms; and
a polyamide resin (b) constituted of a linear aliphatic component having 6 to 18 carbon atoms,
the polyamide resin composition has a tensile modulus of elasticity of 2,000 MPa or less at a temperature of 23° C. and a humidity of 50% RH, and having a content of the polyamide resin (a) in the polyamide resin composition of 20 to 75% by mass.

2, The polyamide resin composition as set forth in the above item 1, wherein the linear aliphatic dicarboxylic acid that constitutes the polyamide resin (a) is at least one selected from the group consisting of adipic acid and sebacic acid.

3, The polyamide resin composition as set forth in the above item 1 or 2, wherein the polyamide resin (b) is at least one resin selected from the group consisting of nylon 6/66, nylon 6, nylon 11, and nylon 12.

4, The polyamide resin composition as set forth in any one of the above items 1 to 3, wherein the thermoplastic resin (A) is at least one resin selected from the group consisting of polyethylene, polypropylene, polyester, and polyvinyl chloride.

5, The polyamide resin composition as set forth in any one of the above items 1 to 4, wherein the dicarboxylic acid component that constitutes the polyamide resin (a) contains a linear aliphatic dicarboxylic acid having 6 to 18 carbon atoms and isophthalic acid, and a molar ratio of the linear aliphatic dicarboxylic acid having 6 to 18 carbon atoms and isophthalic acid [(linear aliphatic dicarboxylic acid having 6 to 18 carbon atoms)/(isophthalic acid)] is 50/50 to 99/1.

6, A delamination container which comprises a laminate of at least two layers including an outer layer (1) composed of a thermoplastic resin (A) and an inner layer (2) composed of a polyamide resin composition and capable of being delaminated from the outer layer (1) to perform volume reduction deformation and in which an outside air introduction hole for introducing the outside air into between the outer layer (1) and the inner layer (2) is formed in the outer layer (1), wherein the polyamide resin composition is the polyamide resin composition as set forth in any one of the above items 1 to 5.

7, A method for producing the delamination container as set forth in the above item 6, the method comprising:

direct blow molding the thermoplastic resin (A) as the outer layer (1) and the polyamide resin composition as set forth in any one of the above items 1 to 5 as the inner layer (2), respectively, thereby producing a container comprising the outer layer and the inner layer, and forming an outside air introduction hole for introducing the outside air into between the outer layer (1) and the inner layer (2) in the outer layer (1) of the container.

The polyamide resin composition of the present invention is suitable as a material for inner layer of a delamination container, and the delamination container using this polyamide resin composition as the inner layer is excellent in delamination properties between the outer layer and the inner layer of the delamination container, performs volume reduction deformation of only the inner layer with a decrease in the contents preserved within the inner layer without causing deformation of the outer layer, has a low oxygen transmission coefficient, and is excellent in oxygen barrier properties.

DETAILED DESCRIPTION OF PREFERRED EMBODIMENTS

The polyamide resin composition of the present invention is a polyamide resin composition for inner layer of a delamination container which comprises a laminate of at least two layers including an outer layer (1) composed of a thermoplastic resin (A) and an inner layer (2) composed of a polyamide resin composition and capable of being delaminated from the outer layer (1) to perform volume reduction deformation and in which an outside air introduction hole for introducing the outside air into between the outer layer (1) and the inner layer (2) is formed in the outer layer (1). By using the polyamide resin composition of the present invention as a material for inner layer of such a delamination container, delamination properties between the outer layer and the inner layer of the delamination container are excellent, only the inner layer is subjected to volume reduction deformation with a decrease in the contents preserved within the inner layer without causing deformation of the outer layer, an oxygen transmission coefficient is low, and oxygen barrier properties are excellent.

The delamination container has a function such that only the inner layer is subjected to volume reduction deformation with a decrease in the contents preserved within the inner layer without causing deformation of the outer layer. For that reason, the inner layer in the delamination container is not only required to have excellent delamination properties from the outer layer but also required to be faithfully subjected to volume reduction deformation with a decrease in the contents. Meanwhile, on the occasion that the inner layer is delaminated from the outer layer, the outside air is introduced into between the outer layer and the inner layer, and therefore, the delamination container is required to have oxygen barrier properties as the material for inner layer.

In general, as a resin material having high gas barrier properties, an ethylene-vinyl alcohol copolymer (EVOH), polyvinyl alcohol (PVA), poly-m-xylylene adipamide (MXD6), and the like are known. But, EVOH and PVA have a drawback such that they are liable to absorb moisture, so that the gas barrier properties are lowered at a high humidity. On the occasion that the inner layer of the delamination container is delaminated from the outer layer, it comes into contact with the outside air, and therefore, EVOH and PVA are not suitable as the material for inner layer of the delamination container. Meanwhile, though MXD6 does not have a problem regarding the hygroscopicity, it is poor in flexibility and cannot be faithfully subjected to volume reduction deformation with a decrease in the contents, and therefore, MXD6 is not suitable as the material for inner layer of the delamination container.

As a result of extensive and intensive investigations, the present inventors have found that when a polyamide resin composition in which a specified polyamide resin (a) represented by MXD6 and a polyamide resin (b) constituted of a linear aliphatic component, such as nylon 6, are blended in a specified ratio is used as an inner layer of a delamination container, delamination properties between an outer layer and the inner layer of the delamination container are excellent, only the inner layer is subjected to volume reduction deformation with a decrease in the contents preserved within the inner layer without causing deformation of the outer layer, an oxygen transmission coefficient is low, and oxygen barrier properties are excellent. The present invention has been achieved on the basis of such finding.

The polyamide resin composition of the present invention contains a polyamide resin (a) constituted of a diamine component including 70 mol % or more of m-xylylenediamine and a dicarboxylic acid component including 70 mol % or more of a linear aliphatic dicarboxylic acid having 6 to 18 carbon atoms, and a polyamide resin (b) constituted of a linear aliphatic component having 6 to 18 carbon atoms.

<Polyamide Resin (a)>

The polyamide resin (a) which is used in the present invention is constituted of a diamine component including 70 mol % or more of m-xylylenediamine and a dicarboxylic acid component including 70 mol % or more of a linear aliphatic dicarboxylic acid having 6 to 18 carbon atoms.

From the viewpoint of revealing excellent oxygen barrier properties, the diamine component that constitutes the polyamide resin (a) includes 70 mol % or more, preferably 80 mol % or more and 100 mol % or less, and more preferably 90 mol % or more and 100 mol % or less of m-xylylenediamine.

Examples of the diamine component other than m-xylylenediamine may include aromatic diamines, such as o-xylylenediamine, p-xylylenediamine, and p-phenylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aliphatic diamines, such as tetramethylenediamine, pentamethylenediamine, hexamethylenediamine, heptamethylenediamine, octamethylenediamine, nonamethylenediamine, decamethylenediamine, dodecamethylenediamine, 2,2,4-trimethylhexamethylenediamine, 2,4,4-trimethylhexamethylenediamine, and 2-methyl-1,5-pentanediamine; however, it should not be construed that the diamine component is limited thereto.

From the viewpoint of revealing excellent oxygen barrier properties, the dicarboxylic acid component that constitutes the polyamide resin (a) includes 70 mol % or more, preferably 80 mol % or more and 100 mol % or less, and more preferably 90 mol % or more and 100 mol % or less of a linear aliphatic dicarboxylic acid having 6 to 18 carbon atoms.

Examples of the linear aliphatic dicarboxylic acid having 6 to 18 carbon atoms may include adipic acid, pimelic acid, suberic acid, azelaic acid, sebacic acid, 1,10-decanedicarboxylic acid, 1,11-undecanedicarboxylic acid, 1,12-dodecanedicarboxylic acid, and the like. Of these, from the viewpoint of revealing excellent oxygen barrier properties, at least one selected from adipic acid and sebacic acid is preferred, and adipic acid is more preferred. These can be used solely or in combination of two or more kinds thereof.

Examples of the dicarboxylic acid component other than the linear aliphatic dicarboxylic acid having 6 to 18 carbon atoms may include aliphatic dicarboxylic acids, such as oxalic acid, malonic acid, succinic acid, and glutaric acid; aromatic dicarboxylic acids, such as terephthalic acid, isophthalic acid, and 2,6-naphthalenedicarboxylic acid; and the like; however, it should not be construed that the dicarboxylic acid component is limited thereto.

In the case of using a mixture of a linear aliphatic dicarboxylic acid having 6 to 18 carbon atoms and isophthalic acid as the dicarboxylic acid component, since the polyamide resin (a) is hardly crystallized, molding processability can be improved, and a lowering of flexibility to be caused due to crystallization of the polyamide resin (a) during a period of time when the contents are charged and preserved can be prevented from occurring. A molar ratio of the linear aliphatic dicarboxylic acid having 6 to 18 carbon atoms and isophthalic acid [(linear aliphatic dicarboxylic acid having 6 to 18 carbon atoms)/(isophthalic acid)] is preferably 50/50 to 99/1, and more preferably 70/30 to 95/5.

The production of the polyamide resin (a) is not particularly limited and can be carried out by an arbitrary method under an arbitrary polymerization condition. The polyamide resin (a) can be, for example, produced by a method in which a salt composed of the diamine component and the dicarboxylic acid component is subjected to temperature rise in a pressurized state in the presence of water, and polymerization is carried out in a molten state while removing the added water and condensed water. In addition, the polyamide resin (a) can also be produced by a method in which the diamine component is added directly to the dicarboxylic acid component in a molten state, and polycondensation is carried out at atmospheric pressure. In this case, in order to keep the reaction system in a uniform liquid state, the diamine component is continuously added to the dicarboxylic acid component, and during that period, the polycondensation is advanced while subjecting the reaction system to temperature rise such that the reaction temperature does not fall below a melting point of each of the formed oligoamide and polyamide. At the time of polycondensation, a small amount of a monoamine or a monocarboxylic acid may be added as a molecular weight modifier.

A relative viscosity is generally adopted as an index of a degree of polymerization of the polyamide resin. From the viewpoints of drawdown prevention at the time of molding and molding processability, the relative viscosity of the polyamide resin (a) which is used in the present invention is preferably 2.5 to 4.5, more preferably 2.6 to 4.3, and still more preferably 2.7 to 4.2.

The relative viscosity as referred to herein is a ratio of a fall time (t) obtained by dissolving 1 g of the polyamide resin in 100 mL of 96% sulfuric acid and measuring the solution at 25° C. by a Cannon-Fenske viscometer to a fall time ($t_0$) of the 96% sulfuric acid itself as similarly measured and is expressed according to the following equation.

Relative viscosity=$t/t_0$

In addition, from the viewpoint of molding processability, a melting point of the polyamide resin (a) is preferably in the range of 160 to 250° C., more preferably 170 to 245° C., and still more preferably 180 to 240° C.

<Polyamide Resin (b)>

The polyamide resin (b) which is used in the present invention is constituted of a linear aliphatic component having 6 to 18 carbon atoms.

The polyamide resin (b) may also be constituted of a linear aliphatic diamine component having 6 to 18 carbon atoms and a linear aliphatic dicarboxylic acid component having 6 to 18 carbon atoms, or may also be constituted of an ω-aminocarboxylic acid component having 6 to 18 carbon atoms. In addition, as the ω-aminocarboxylic acid component having 6 to 18 carbon atoms, a lactam obtained by dehydration condensation of an ω-aminocarboxylic acid having 6 to 18 carbon atoms in a molecule thereof can also be used. In addition, the polyamide resin (b) may also be a copolymer of these components.

Examples of the linear aliphatic diamine component having 6 to 18 carbon atoms may include hexamethylenediamine, nonamethylenediamine, and the like; however, it should not be construed that the linear aliphatic diamine component is limited thereto. These can be used solely or in combination of two or more kinds thereof. The linear aliphatic dicarboxylic acid component having 6 to 18 carbon atoms is the same as that explained for the polyamide (a), and a preferred range thereof is also the same.

Examples of the polyamide resin which is constituted of a linear aliphatic diamine component having 6 to 18 carbon atoms and a linear aliphatic dicarboxylic acid component having 6 to 18 carbon atoms include nylon 66 constituted of hexamethylenediamine and adipic acid, and the like.

Examples of the ω-aminocarboxylic acid component having 6 to 18 carbon atoms may include 6-aminohexanoic acid, 12-aminododecanoic acid, and the like; however, it should not be construed that the oyaminocarboxylic acid component is limited thereto. These can be used solely or in combination of two or more kinds thereof. In addition, examples of the lactam obtained by dehydration condensation of an ω-aminocarboxylic acid having 6 to 18 carbon atoms in a molecule thereof may include ε-caprolactam, undecane lactam, and laurolactam; however, it should not be construed that the lactam is limited thereto. These can be used solely or in combination of two or more kinds thereof.

Examples of the polyamide resin constituted of an ω-aminocarboxylic acid component having 6 to 18 carbon atoms or a lactam thereof include nylon 6, nylon 11, nylon 12, and the like.

In addition, examples of the copolymer of the above-described components may include nylon 6/66, nylon 6/12, and the like; however, it should not be construed that the copolymer is limited thereto.

From the viewpoints of flexibility and mechanical strength, the polyamide resin (b) is preferably at least one resin selected from the group consisting of nylon 6/66, nylon 6, nylon 11, and nylon 12, and more preferably at least one resin selected from the group consisting of nylon 6/66 and nylon 6.

The production of the polyamide resin (b) is not particularly limited and can be carried out by an arbitrary method under an arbitrary polymerization condition. In the case where the polyamide resin (b) is constituted of a diamine component and a dicarboxylic acid component, the polyamide resin (b) can be produced in the same manner as that in the above-described polyamide resin (a). In addition, in the case where the polyamide resin (b) is constituted of an ω-aminocarboxylic acid component or a lactam thereof, the polyamide resin (b) can be produced by polycondensation of an oyaminocarboxylic acid or ring-opening polymerization of a lactam.

Preferred ranges of a relative viscosity and a melting point of the polyamide resin (b) are the same as those in the polyamide resin (a).

The polyamide resin composition of the present invention can be obtained by melt kneading the polyamide resins (a) and (b). The polyamide resin composition of the present invention may contain a material other than the polyamide resins (a) and (b) and may contain an arbitrary additive within the range where the effects of the present invention are not hindered.

A content of the polyamide resin (a) in the polyamide resin composition of the present invention is 20 to 75% by mass from the viewpoints that when used as a material for inner layer of the delamination container, the delamination properties between the outer layer and the inner layer are excellent, the flexibility is excellent, so that the volume reduction deformation is faithfully performed with a decrease in the contents, and the oxygen barrier properties are excellent. In the case where the content of the polyamide resin (a) is less than 20% by mass, sufficient delamination properties and oxygen barrier properties cannot be obtained. In the case where the content of the polyamide resin (a) is more than 75% by mass, the flexibility is poor, so that the volume reduction deformation cannot be faithfully performed with a decrease in the contents.

In general, when the modulus of elasticity of a resin is higher, it becomes impossible to relieve the stress, and therefore, interlaminar delamination is liable to occur. In the polyamide resin composition of the present invention, the polyamide resin (a) has an aromatic ring in a skeleton thereof, and therefore, as compared with the sole use of the polyamide resin (b) constituted of a linear aliphatic component, the modulus of elasticity is high, and the delamination properties are improved. In addition to that, in the case where a resin constituted of, as the thermoplastic resin (A), a linear aliphatic component, such as polyethylene, is used for the outer layer, while the polyamide resin (b) having an analogous structure has adhesiveness to some extent, by adding the polyamide resin (a) having a largely different structure, the adhesiveness is greatly lowered, whereby the delamination properties are improved.

Meanwhile, the polyamide resin composition of the present invention has a relatively high modulus of elasticity and is relatively hard because the polyamide resin (a) has an aromatic ring in a skeleton thereof. For that reason, when the content of the polyamide resin (a) is excessively high, the flexibility is poor, so that the volume reduction deformation cannot be faithfully performed with a decrease in the contents.

The preferred range of the content of the polyamide resin (a) in the polyamide resin composition varies according to the kinds of the polyamide resins (a) and (b) used and also varies according to the kind of the thermoplastic resin (A) which is used for the outer layer of the delamination container from the viewpoint of delamination properties. For that reason, the content of the polyamide resin (a) in the polyamide resin composition is properly set within the range of 20 to 75% by mass according to the kinds of the polyamide resins (a) and (b) used in the polyamide resin composition and the thermoplastic resin (A) used for the outer layer of the delamination container.

For example, when the polyamide resin (b) is very soft nylon 6/66, the content of the polyamide resin (a) is preferably 20 to 75% by mass, and when the polyamide resin (b) is nylon 6 that is slightly inferior in flexibility to nylon 6/66, the content of the polyamide resin (a) is preferably 20 to 60% by mass.

A tensile modulus of elasticity of the polyamide resin composition of the present invention at a temperature of 23° C. and a humidity of 50% RH is 2,000 MPa or less, preferably 300 to 2,000 MPa, more preferably 300 to 1,500 MPa, and still more preferably 500 to 1,000 MPa from the viewpoints that when used as a material for inner layer of the delamination container, the delamination properties between the outer layer and the inner layer are excellent, and the flexibility is excellent, so that the volume reduction deformation is faithfully performed with a decrease in the contents.

The polyamide resin composition of the present invention is used as a material for inner layer of the delamination container.

The delamination container has a structure which comprises a laminate of at least two layers including an outer layer (1) composed of a thermoplastic resin (A) and an inner layer (2) composed of a polyamide resin composition and capable of being delaminated from the outer layer (1) to perform volume reduction deformation and in which an outside air introduction hole for introducing the outside air into between the outer layer (1) and the inner layer (2) is formed in the outer layer (1).

The delamination container is not particularly limited so long as it has the above-described structure and may have a structure described in JP-A-2004-231280 or JP-A-8-310534, For example, the delamination container may be a pump-type container in which a cap combined with a dispenser pump is installed in a container mouth part. In addition, the delamination container may be a squeeze-type container which is constructed such that an outer layer thereof is squeeze-deformable and has restorable flexibility and in which a cap with a check valve is installed.

The thermoplastic resin (A) which is used as a material for outer layer of the delamination container is not particularly limited but is properly selected according to an application. Polyolefins, such as polyethylene and polypropylene, polyesters, such as polyethylene terephthalate (PET), polystyrenes, polycarbonates, polyvinyl chloride, and the like can be preferably used. Taking into account molding processability and costs, the thermoplastic resin (A) is preferably at least one resin selected from the group consisting of polyethylene, polypropylene, a polyester, and polyvinyl chloride.

In the case where the delamination container is a pump-type container, the thermoplastic resin (A) is preferably relatively hard, and high-density polyethylene, polypropylene, or the like can be preferably used. Meanwhile, in the case where the delamination container is a squeeze-type container, the thermoplastic resin (A) is preferably relatively soft, and low-density polyethylene, a polyester, or the like can be preferably used.

A position of the outside air introduction hole is not particularly limited, and the outside air introduction hole may be formed in the outer layer of the container mouth part as described in JP-A-8-310534, or may be formed in the outer layer of the container bottom as described in JP-2004-231280.

The delamination container of the present invention can be produced by means of direct blow molding. Specifically, by using a multilayer direct blow apparatus composed of plural extruders and cylindrical dies, the thermoplastic resin (A) as the outer layer and the polyamide resin composition of the present invention as the inner layer are co-extruded to form a cylindrical parison; the parison is extruded in a tubular form; the parison is caught by a die, the temperature of which is controlled to about 10° C. to 80° C.; the parison lower part is pinched off and simultaneously fused; and during a period of time when the resulting parison has not been cooled, blowing with high-pressure air or the like is performed to expand the parison, thereby forming into a shape of a tubular, bottle-formed, or tank-formed container or the like.

Here, the direct blow apparatus used is not particularly limited, but it may be an apparatus composed of a single cylindrical die and a single die, an apparatus having both plural cylindrical dies and plural dies, or a rotary-type direct blow apparatus.

In addition, an in-mold labeling method in which an in-mold label is previously inserted into a die, and the label is stuck onto the container surface may also be adopted. In addition, regardless of the in-mold labeling method, in the case of sticking a label, it is preferred to carry out a flame treatment or a corona treatment prior to sticking a label. Furthermore, it is also possible to apply sandblast processing within a die, thereby rendering the appearance in a frost state.

The outside air introduction hole may be formed by molding the delamination container and then boring only the outer layer as described in JP-A-8-310534, may be formed simultaneously with direct blow molding as described in JP-A-2004-231280, In JP-A-2004-231280, the interlaminar delamination of the seal part formed in the container bottom at the time of direct blow molding is positively utilized as the outside air introduction hole.

Although a layer thickness in the delamination container of the present invention is not particularly limited, a thickness of the outer layer is preferably 300 to 3,000 µm, more preferably 500 to 2,000 µm, and still more preferably 700 to 1,000 µm, and a thickness of the inner layer is preferably 30 to 300 µm, more preferably 50 to 200 µm, and still more preferably 70 to 150 µm.

An oxygen transmission coefficient (unit: cc·mm/m²·day·atm) of the delamination container of the present invention is preferably 0.080 or less, more preferably 0.070 or less, still more preferably 0.065 or less, yet still more preferably 0.055 or less, and especially preferably 0.050 or less. So long as the oxygen transmission coefficient falls within the foregoing range, the oxygen barrier properties are favorable. A measuring method and a measuring condition of the oxygen transmission coefficient are those described in the Examples.

According to the delamination container of the present invention, the inner layer is subjected to volume reduction deformation with a decrease in the contents preserved within the inner layer, and therefore, it is possible to prevent the contents from oxidation without causing direct contact of the contents with the air until the contents are emptied completely. For that reason, it is possible to decrease a use amount of an antioxidant, an antiseptic, or the like for the contents preserved in the delamination container of the present invention.

While the delamination container of the present invention is excellent in oxygen barrier properties and suitable for preservation of a variety of goods, it is especially suitable for preservation of goods in which a single use amount thereof is small. Examples of a preferred material to be preserved may include liquid seasonings, such as soy sauce, ketchup, mayonnaise, and dressing; medicines, such as eye-drop medicine; and miscellaneous goods, such as shampoo, conditioner, and detergent.

EXAMPLES

The present invention is hereunder explained in more detail by reference to Examples, but it should not be construed that the present invention is limited to these Examples. A variety of evaluations in the Examples and the like were carried out by the following methods.

(1) Relative Viscosity of Polyamide Resin 1 g of a polyamide resin was accurately weighed and dissolved in 100 mL of 96% sulfuric acid at 20 to 30° C. with stirring. After complete dissolution, 5 mL of the solution was rapidly taken into a Cannon-Fenske viscometer, allowed to stand in a thermostat at 25° C. for 10 minutes, and then measured for a fall time (t). In addition, a fall time ($t_0$) of the 96% sulfuric acid itself was measured under the same condition. A relative viscosity was calculated from t and to according to the following equation.

$$\text{Relative viscosity} = t/t_0$$

(2) Melting Point of Polyamide Resin

By using a differential scanning calorimeter ("DSC-60", manufactured by Shimadzu Corporation), a polyamide resin was subjected to temperature rise to 260° C. in a nitrogen atmosphere at a temperature rise rate of 10° C./min, thereby measuring a melting point of the polyamide resin.

(3) Outer Layer/Inner Layer Thickness

A container was cut horizontally in a half height, thicknesses of an outer layer and an inner layer were measured, respectively at intervals of 45° starting from a parting part, and an average value thereof was calculated.

(4) Interlaminar Delamination Strength

An interlaminar delamination strength between an inner layer and an outer layer was measured by a T-type delamination test in conformity with JIS K6854, A test piece was fabricated by cutting a container body in a width of 10 mm in the vertical direction. A delamination rate was set to 100 mm/min. A sample which caused delamination originally and a sample in which a measured value was a detection limit or less were expressed as "no value".

(5) Tensile Modulus of Elasticity of Inner Layer

A tensile modulus of elasticity of an inner layer was measured by using a strograph, manufactured by Toyo Seiki Seisaku-Sho, Ltd. in conformity with JIS K7127 and K7161, A test piece was fabricated by cutting an inner layer of a container body in a width of 10 mm in the vertical direction. A chuck-to-chuck distance was set to 50 mm, a tensile rate was set to 50 mm/min, and a measurement environment was set at a temperature of 23° C. and a humidity of 50% RH.

(6) Volume Reduction Deformation Properties of Inner Layer

A container bottom was pushed onto a conical tool with a round tip; a pinch off of an outer layer was delaminated to provide a gap for air intake between the outer layer and an inner layer; thereafter, a mouth of the container was connected with a vacuum pump; the inside of the container was evacuated for 5 seconds; the outer layer was then cut; and volume reduction deformation properties of the inner layer were evaluated through visual inspection according to the following criteria. "Diaphragm Pump V-700", manufactured by Nihon BUCHI K.K. was used as the vacuum pump.

A: The inner layer is entirely delaminated and shrunk closely.

B: The inner layer is entirely delaminated but not completely shrunk.

C: The inner layer is not completely delaminated.

(7) Oxygen Transmission Coefficient of Container

An oxygen transmission rate of a container was measured by using an oxygen transmission rate measurement system ("OX-TRAN2/61", manufactured by MOCON Inc.) in conformity with ASTM D3985, A measurement environment was set at a temperature of 23° C., a humidity of the container outside was set to 50% RH, and a humidity of the container inside was set to 100% RH. An oxygen transmission coefficient (unit: cc·mm/m$^2$·day·atm) was calculated from the obtained oxygen transmission rate by using an average thickness of the container body and a surface area of the container.

Production Example 1

(Production of Polyamide Resin (a-1))

A heating jacket-equipped SUS-made reaction vessel having an inner capacity of 50 liters, which was provided with a partial condenser, a total condenser, a pressure gauge, a nitrogen inlet, a liquid inlet, a resin discharge valve, and stirrer, was charged with 15,000 g (102.6 mol) of adipic acid, 17.3 g (0.16 mol) of sodium hypophosphite, and 12.1 g (0.15 mol) of sodium acetate, and the inside of the reaction vessel was purged with nitrogen. Subsequently, the reaction vessel was heated to 170° C. at atmospheric pressure while circulating nitrogen at a rate of 10 mL/min, thereby completely fusing the adipic acid, and thereafter, the dropwise addition of 13,980 g (102.6 mol) of m-xylylenediamine was started. During the dropwise addition of m-xylylenediamine, the temperature was continuously raised while removing the formed water by polycondensation from the system, such that the inside of the reaction system was not solidified. The whole amount of m-xylylenediamine was added dropwise over 100 minutes, and also, the inner temperature of the reaction vessel was raised to 250° C. Subsequently, the inner temperature was increased to 260° C. over 10 minutes as it was at atmospheric pressure, and thereafter, the inside of the reaction vessel was evacuated to 600 mmHg over 10 minutes by using an aspirator and a pressure regulator while keeping the inner temperature at 260° C., and the polycondensation reaction was continued at 600 mmHg. At a point of time when the viscosity of the resin became thoroughly high while observing a torque of the stirrer, the stirring was stopped; after pressurizing the inside of the reaction vessel with nitrogen to 0.2 MPa, the resin discharge valve of the reaction vessel bottom was opened to discharge a polymer in a strand form; and after cooling with water, the polymer was pelletized by a pelletizer, thereby obtaining about 25 kg of pellets of a polyamide resin.

Subsequently, a jacket-equipped tumbler dryer provided with a nitrogen gas introduction tube, a vacuum line, a vacuum pump, and a thermocouple for measuring an inner temperature was charged with the pellets of the polyamide resin; after thoroughly purging the inside of the tumbler dryer with a nitrogen gas having a purity of 99% by volume or more while rotating it at a fixed speed, the tumbler dryer was heated under the same nitrogen gas stream; and the pellet temperature was raised to 150° C. over about 150 minutes. At a point of time when the pellet temperature reached 150° C., the pressure within the system was reduced to 1 Torr or less. The temperature rise was further continued, and the pellet temperature was raised to 200° C. over about 70 minutes, followed by keeping at 200° C. for 70 minutes. Subsequently, a nitrogen gas having a purity of 99% by volume or more was introduced into the system, and the pellets were cooled while rotating the tumbler dryer, thereby obtaining a polyamide resin (a-1). The obtained polyamide resin (a-1) had a relative viscosity of 3.5 and a melting point of 237° C.

Production Example 2

(Production of Polyamide Resin (a-2))

A polyamide resin (a-2) was obtained in the same manner as that in Production Example 1, except that among the polyamide raw materials, the dicarboxylic acid component was changed to 13,495 g (92.3 mol) of adipic acid and 1,705 g (10.3 mol) of isophthalic acid, respectively. The obtained polyamide resin (a-2) had a relative viscosity of 3.4 and a melting point of 222° C.

The following resins were used in the Examples and the like.

<Thermoplastic Resin (A) for Outer Layer>

A-1: High-density polyethylene ("NOVATEC HD HB420R", manufactured by Nippon Polyethylene Co., Ltd., MFR=0.2 g/10 min (JIS K6922-2))

A-2: Polypropylene ("NOVATEC PPEC9", manufactured by Nippon Polypropylene Co., Ltd., MFR=0.5 g/10 min (JIS K7210))

<Polyamide Resin (b) for Inner Layer> b-1: Nylon 6/66 ("UBE NYLON 5033B", manufactured by Ube Industries, Ltd., relative viscosity: 4.1, melting point: 196° C.)

b-2: Nylon 6 ("UBE NYLON 1030B", manufactured by Ube Industries, Ltd., relative viscosity: 4.1, melting point: 220° C.)

<Thermoplastic Resin (c) for Inner Layer> c-1: Ethylene-vinyl alcohol copolymer ("EVAL F101B", manufactured by Kuraray Co., Ltd.)

Example 1

A two-layer direct blow molding apparatus provided with a single-screw extruder for outer layer, a single-screw extruder for inner layer, an adapter, a parison controller-equipped cylindrical die, a die, an air blow device, and the like was used; pellets of the thermoplastic resin A-1 were charged into a hopper of the extruder for outer layer, the extruder cylinder temperature was set to 200 to 220° C., and the adapter temperature was set to 230° C.; also, mixed pellets obtained by dry blending the polyamide resin a-1 and the polyamide resin b-1 in a proportion of 75/25 in terms of a mass ratio were charged into a hopper of the extruder for inner layer, and a parison was extruded by setting an extruder cylinder temperature at 240 to 260° C., an adapter temperature at 250° C., and a die temperature at 245° C., respectively; and a screw-capped two-layer bottle having an inner capacity of 400 mL, a body outer layer thickness of about 900 μm, and an inner layer thickness of about 100 μm was molded by the direct blow method.

The resulting bottle was measured for the outer layer/inner layer thickness, the interlaminar delamination strength, the tensile modulus of elasticity of inner layer, the volume reduction deformation properties of inner layer, and the oxygen transmission coefficient. Results are shown in Table 1.

Examples 2 to 8

Screw-capped two-layer bottles were molded in the same manner as that in Example 1, except that the kinds and mass ratios of the thermoplastic resin (A), the polyamide resin (a), and the polyamide resin (b) were changed to those shown in Table 1.

The resulting bottle was measured for the outer layer/inner layer thickness, the interlaminar delamination strength, the tensile modulus of elasticity of inner layer, the volume reduction deformation properties of inner layer, and the oxygen transmission coefficient. Results are shown in Table 1.

Comparative Examples 1 to 5

Screw-capped two-layer bottles were molded in the same manner as that in Example 1, except that the kinds and mass ratios of the thermoplastic resin (A), the polyamide resin (a), the polyamide resin (b), and the thermoplastic resin (c) for inner layer were changed to those shown in Table 1.

The resulting bottle was measured for the outer layer/inner layer thickness, the interlaminar delamination strength, the tensile modulus of elasticity of inner layer, the volume reduction deformation properties of inner layer, and the oxygen transmission coefficient. Results are shown in Table 1, nylon 6/66 was poor in volume reduction deformation properties of the inner layer because of a high value of the delamination strength between the inner layer and the outer layer. In Comparative Examples 2 and 4 in which the proportion of the polyamide resin (a) in the polyamide resin composition that constitutes the inner layer is high, the volume reduction deformation properties were poor because the modulus of elasticity of the inner layer was excessively high. In Comparative Example 3 in which the proportion of the polyamide resin (a) in the polyamide resin composition that constitutes the inner layer is low, the value of the delamination strength between the inner layer and the outer layer was high, and the volume reduction deformation properties of the inner layer were poor. The delamination container of Comparative Example 5 in which the material that constitutes the inner layer is an ethylene-vinyl alcohol copolymer was poor in volume reduction deformation properties of the inner layer because of a high value of the delamination strength between the inner layer and the outer layer.

The polyamide resin composition of the present invention is suitable as a material for inner layer of a delamination container, and the delamination container using this polyamide resin composition as the inner layer is excellent in delamination properties between the outer layer and the inner layer of the delamination container, performs volume reduction deformation of only the inner layer with a decrease in the contents preserved within the inner layer without causing deformation of the outer layer, has a low oxygen transmission coefficient, and is excellent in oxygen barrier properties.

TABLE 1

| | Outer layer (1) | Inner layer (2) | | | | Layer thickness [μm] | | Delamination strength [g/10 mm] | Modulus of elasticity of inner layer [MPa] | Volume reduction deformation properties | Oxygen transmission coefficient *1 |
|---|---|---|---|---|---|---|---|---|---|---|---|
| | Thermoplastic resin (A) | Polyamide (a) | Polyamide (b) | Thermoplastic resin (c) | Mass ratio ((a)/(b)) | Outer layer | Inner layer | | | | |
| Example 1 | A-1 | a-1 | b-1 | — | 75/25 | 906 | 105 | No value | 1531 | A | 0.033 |
| Example 2 | A-1 | a-1 | b-1 | — | 20/80 | 911 | 109 | No value | 773 | A | 0.064 |
| Example 3 | A-1 | a-2 | b-1 | — | 75/25 | 904 | 100 | No value | 1667 | A | 0.039 |
| Example 4 | A-1 | a-2 | b-1 | — | 20/80 | 909 | 110 | No value | 668 | A | 0.069 |
| Example 5 | A-1 | a-1 | b-2 | — | 60/40 | 908 | 106 | No value | 1990 | A | 0.039 |
| Example 6 | A-1 | a-1 | b-2 | — | 20/80 | 904 | 98 | No value | 864 | A | 0.067 |
| Example 7 | A-2 | a-1 | b-1 | — | 75/25 | 911 | 108 | No value | 1519 | A | 0.039 |
| Example 8 | A-2 | a-1 | b-1 | — | 20/80 | 906 | 105 | No value | 744 | A | 0.067 |
| Comparative Example 1 | A-1 | — | b-1 | — | 0/100 | 909 | 109 | 114 | 641 | C | 0.106 |
| Comparative Example 2 | A-1 | a-1 | b-1 | — | 80/20 | 905 | 101 | No value | 2540 | B | 0.028 |
| Comparative Example 3 | A-1 | a-1 | b-1 | — | 10/90 | 912 | 108 | 101 | 650 | C | 0.086 |
| Comparative Example 4 | A-2 | a-1 | b-1 | — | 80/20 | 904 | 100 | No value | 2521 | B | 0.033 |
| Comparative Example 5 | A-1 | — | — | c-1 | — | 906 | 101 | 132 | 812 | C | 0.400 |

*1: Unit of oxygen transmission coefficient = [cc · mm/m² · day · atm]

The delamination container using, as the inner layer, the polyamide resin composition of the present invention is excellent in delamination properties between the outer layer and the inner layer of the delamination container, favorable in volume reduction deformation of the inner layer, low in oxygen transmission coefficient, and excellent in oxygen barrier properties.

On the other hand, the delamination container of Comparative Example 1 in which the polyamide resin composition that constitutes the inner layer is composed of only

The invention claimed is:

1. A delamination container which comprises a laminate of at least two layers including an outer layer (1) composed of a thermoplastic resin (A) and an inner layer (2) composed of a polyamide resin composition and capable of being delaminated from the outer layer (1) to perform volume reduction deformation and in which an outside air introduction hole for introducing the outside air into between the outer layer (1) and the inner layer (2) is formed in the outer layer (1), wherein the polyamide resin composition comprises:

a polyamide resin (a) constituted of a diamine component including 70 mol % or more of m-xylylenediamine and a dicarboxylicg acid component including 70 mol % or more of a linear aliphatic dicarboxylicg acid having 6 to 18 carbon atoms; and a polyamide resin (b) constituted of a linear aliphatic component having 6 to 18 carbon atoms, the polyamide resin composition has a tensile modulus of elasticity of 2,000 MPa or less at a temperature of 23° C. and a humidity of 50% RH, and having a content of the polyamide resin (a) in the polyamide resin composition of 20 to 75% by mass.

2. A method for producing the delamination container according to claim 1, the method comprising:

direct blow molding the thermoplastic resin (A) as the outer layer (1) and said polyamide resin composition as the inner layer (2), respectively, thereby producing a container comprising the outer layer and the inner layer with the inner layer capable of being delaminated from the outer layer to perform volume reduction deformation, and forming an outside air introduction hole for introducing the outside air into between the outer layer (1) and the inner layer (2), in the outer layer (1) of the container.

3. The delamination container according to claim 1, wherein the linear aliphatic dicarboxylicg acid that constitutes the polyamide resin (a) is at least one selected from the group consisting of adipic acid and sebacic acid.

4. The delamination container according to claim 1, wherein the polyamide resin (b) is at least one resin selected from the group consisting of nylon 6/66, nylon 6, nylon 11, and nylon 12.

5. The delamination container according to claim 1, wherein the thermoplastic resin (A) is at least one resin selected from the group consisting of polyethylene, polypropylene, polyester, and polyvinyl chloride.

6. The delamination container according to claim 1, wherein the dicarboxylicg acid component that constitutes the polyamide resin (a) contains a linear aliphatic dicarboxylicg acid having 6 to 18 carbon atoms and isophthalic acid, and a molar ratio of the linear aliphatic dicarboxylicg acid having 6 to 18 carbon atoms and isophthalic acid [(linear aliphatic dicarboxylicg acid having 6 to 18 carbon atoms)/(isophthalic acid)] is 70/30 to 99/1.

* * * * *